United States Patent [19]

Lee

[11] Patent Number: 5,742,055

[45] Date of Patent: Apr. 21, 1998

[54] DEVICE FOR SENSING POSITION OF HUMAN BODY USING INFRARED SENSOR

[75] Inventor: Don-Hee Lee, Bisan-dong, Rep. of Korea

[73] Assignee: LG Electronics Inc., Seoul, Rep. of Korea

[21] Appl. No.: 677,501

[22] Filed: Jul. 10, 1996

[30] Foreign Application Priority Data

Jul. 13, 1995 [KR] Rep. of Korea ............... 20671 1995

[51] Int. Cl.$^6$ .............. G08B 13/18; G08B 13/191; G08B 13/193

[52] U.S. Cl. ................... 250/353; 250/DIG. 1

[58] Field of Search ................ 250/342, 353, 250/DIG. 1

[56] References Cited

FOREIGN PATENT DOCUMENTS

| | | | |
|---|---|---|---|
| 1-277796 | 11/1989 | Japan | 250/DIG. 1 |
| 3-2590 | 1/1991 | Japan | 250/DIG. 1 |
| 2122339 | 1/1984 | United Kingdom | 250/DIG. 1 |

Primary Examiner—Edward J. Glick
Attorney, Agent, or Firm—John P. White

[57] ABSTRACT

The present invention relates to a device for sensing the position of a human body using an infrared ray sensor including: a light focusing device for converging an infrared ray emitted from the human body; a guiding device for guiding only a predetermined direction infrared ray among the infrared rays converged by the light focusing device; an infrared ray sensing device for sensing the infrared ray received by the guiding device; a direction shifting device for shifting the sensing direction of the infrared ray sensing part up, down, right and left; a circuit device for amplifying the output of the infrared ray sensing device, A/D converting it and then driving the direction shifting device; and a determination device for determining the position, movement direction and the activity of a human body using an output signal of the circuit device and a driving timing of the direction shifting device.

6 Claims, 3 Drawing Sheets

DEVICE FOR SENSING POSITION OF HUMAN BODY USING INFRARED SENSOR

BACKGROUND OF THE INVENTION

The present invention relates to a device for sensing the position of a human body using an infrared sensor, which is capable of sensing the location and direction of movement of anyone present as well as the presence of a human body and the amount of activity.

As is well known, infrared sensors are classified into pyroelectric infrared and quantum sensors. Even though the pyroelectric sensors have an inferior sensitivity of detection compared to that of quantum sensor, they are low in production cost and permit a simplification in manufacture, since they employ a non-cooling system to be driven at room temperature. Hence, the pyroelectric sensors come into wider use in anti-crime and disaster-preventive apparatuses and for air-conditioning systems. When a pyroelectric substance of such a sensing device receives an infrared ray emitted from a heat source such as a human body, there is a change in temperature of the pyroelectric substance, which brings about the flow of pyroelectricity according to the corresponding change in polarization of the pyroelectric substance to sense the heat source thereby. In recent years, $PbTiO_3$, ceramic such as PZT, $LiTaO_3$, polyvinylidene fluoride polymer, etc. have been used as pyroelectric materials, and a thin film of a ferroelectric substance has also been used.

The following description refers to a conventional infrared sensor referring to the accompanying drawings.

FIG. 1 is a sectional view of the structure of a conventional infrared sensor, and FIG. 2 graphically illustrates temperature-polarization characteristics of a general ferroelectric substance. FIG. 3 depicts an equivalent circuit diagram of the conventional infrared sensor.

The conventional infrared sensing device, as illustrated in FIG. 1, includes a pyroelectric or ferroelectric chip 1 which is an infrared ray sensing element and installed in the air by being supported by the supporter 2, a gate resistor 4 and a field effect transistor 5 mounted on a circuit substrate 3 under the pyroelectric chip 1, a filter 6 formed over the pyroelectric chip 1, and a metal package 7 to form a sealed structure.

As the temperature of the ferroelectric substance of the infrared sensing device increases, the polarization of the infrared sensing device decreases, as shown in FIG. 2. The polarization of the pyroelectric sensing device comes up to P1 at temperature $T_1$, and dipoles having positive and negative charges are generated in proportion to the polarization. At this point, when the temperature rises to a point $T_2$, the polarization of the pyroelectric sensing device is reduced to $P_2$, and the number of the dipoles is decreased by $P_2$, whereby the negative and positive charges equivalent to the number of the dipoles by $P_1-P_2$ ($\Delta P$: decrement of polarization) pass through a metal line. Such negative and positive charges form a flow of pyroelectric current, and the sensing device sensitively detects temperatures with the change in the flow of pyroelectricity.

Referring to FIG. 3, as the temperature rises to $T_2$ from $T_1$, the polarization of the pyroelectric or ferroelectric chip 1 is reduced to $P_2$ from $P_1$, which decreases the number of dipoles and generation of the positive and negative charges by the decrement of the dipoles.

The pyroelectric current is transformed to an impedance value by the gate resistance 4 to be applied to a gate of FET 5, and FET 5 sensitively reacts to generate a sensor detection signal.

Such a conventional infrared sensor is capable of sensing the presence of a human body and the amount of activity, but cannot detect the location and direction of movement or the distance between the human body and the sensor itself.

Although there is a method for sensing the infrared ray by arranging a plurality of sensors, it requires a great number of sensors, and thus is high in manufacturing costs.

SUMMARY OF THE INVENTION

The present invention is designed to solve the problems of the prior art and to provide a device for sensing the position of a human body using an infrared sensor, capable of sensing not only the presence of a human body and the amount of activity, but also the location and direction of movement of anyone present.

To achieve the above object, the device for sensing the position of a human body using the infrared sensor of the present invention senses the presence of the human body by a direction shifting device which scans an infrared ray emitted from the human body up, down, right and left, and also finds out the presence and activity of the human body by the shifting angle of the scanning operation.

BRIEF DESCRIPTION OF THE ATTACHED DRAWINGS

FIG. 1 is a configuration diagram of a conventional infrared sensor;

FIG. 2 graphically illustrates the temperature characteristics of the polarization amount of a general infrared sensor;

Figure 6:
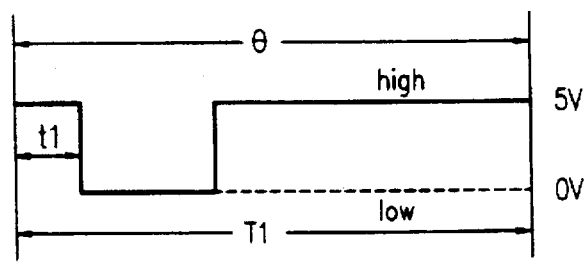

FIG. 6 graphically illustrates the determination of the position of a human body using the present invention.

DETAILED DESCRIPTION OF PREFERRED EMBODIMENT

With reference to the attached drawings, a device for sensing the position of a human body using an infrared sensor according to the present invention will be described below.

Figure 1:
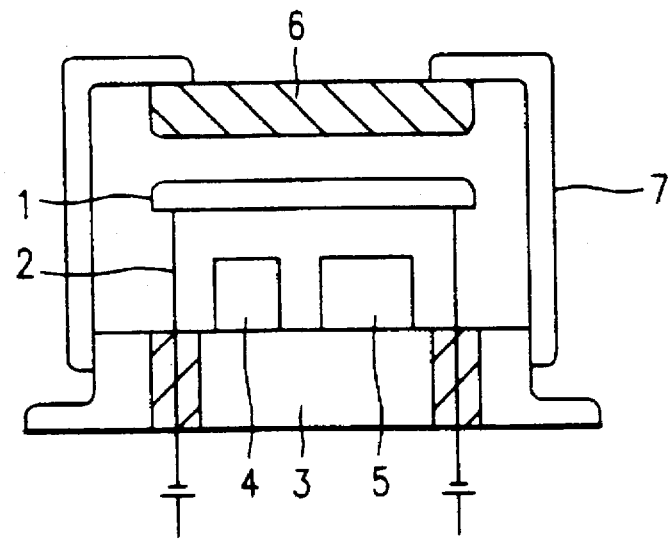
Figure 2:
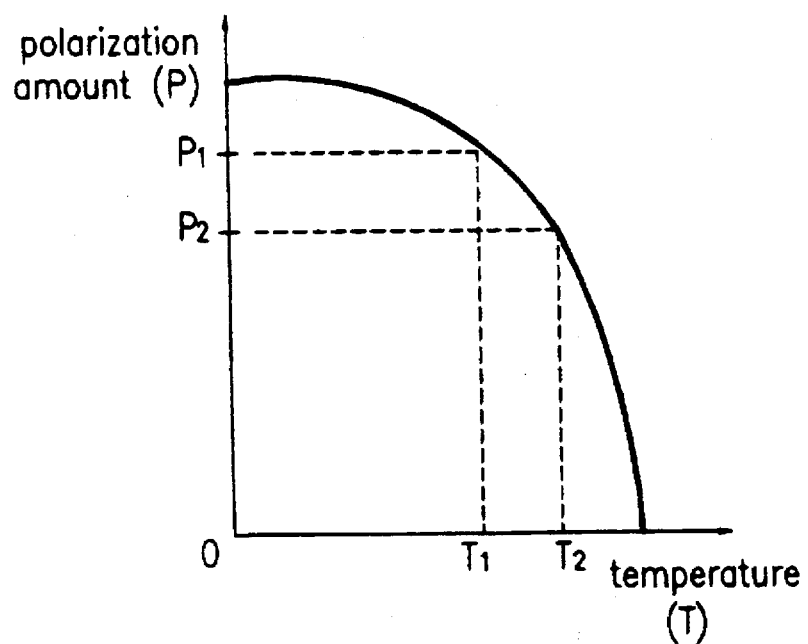
Figure 3:
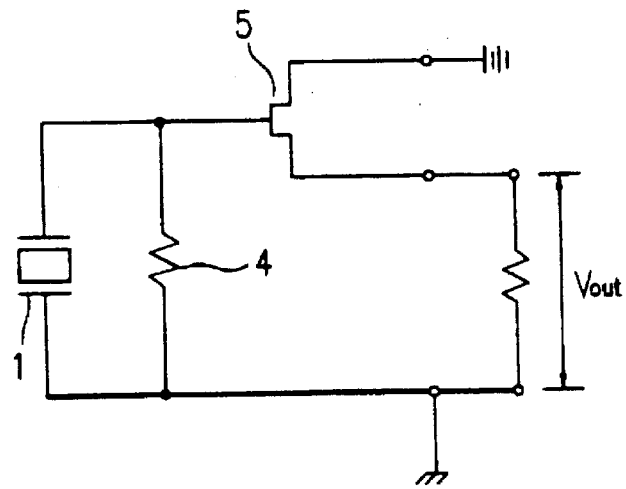
FIG. 3 is an equivalent circuit diagram of a conventional infrared sensor.
Figure 4:
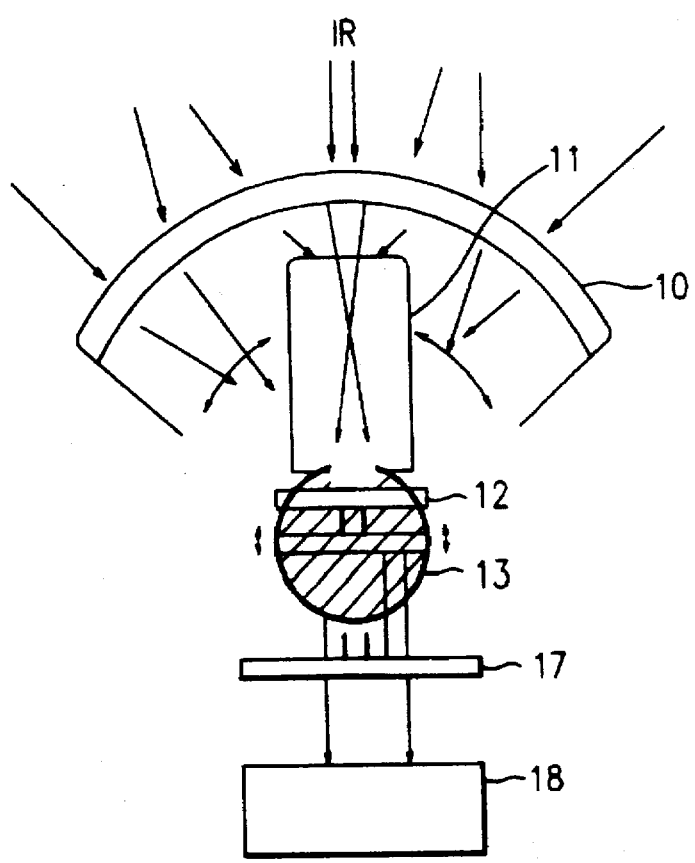
FIG. 4 is a configuration diagram of a device for sensing the position of a human body using an infrared sensor of the present invention.
Figure 5:
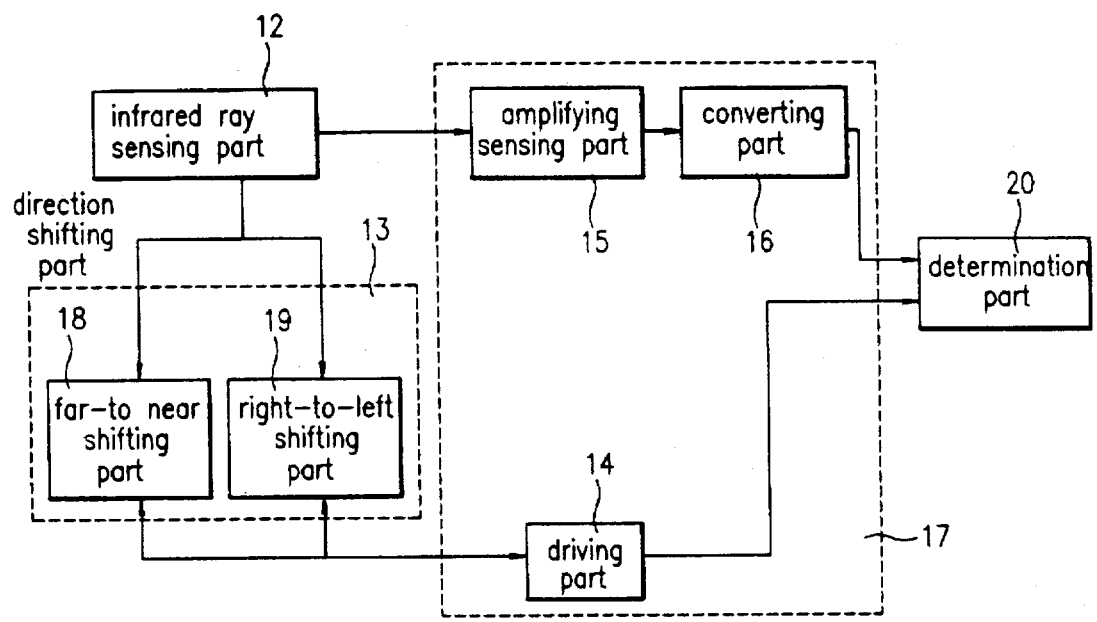
FIG. 5 is a block diagram of the device of the present invention.

As illustrated in FIGS. 4 and 5, the device of the present invention includes a light focusing part 10 for converging an infrared ray (IR) emitted from a human body; a guide part 11, which is a cylindrical metal or cylindrical plastic having a metal coated inside for selectively dividing and passing an infrared ray from a certain position among the infrared rays converged in the light focusing part 10; an infrared ray sensing part (a thermo-detecting device) 12, which is a thermopile sensor or a pyroelectric infrared sensor, for sensing the infrared ray IR through the guide part 11; a direction shifting device 13 for shifting the sensing direction of the infrared ray sensing part 12 up, down, right and left; a driving part 14 for supplying power to drive the direction shifting device; an amplifying sensing part 15 for amplifying the pyroelectric current generated in the infrared ray sensing part 12; a circuit device 17 which consists of an A/D converting part 16 for converting an analog signal of the amplifying sensing part 15 into a logic signal(digital signal); and a determination part 20 for determining the position and shifting direction of the human body, using a sensing signal generated in the circuit device and a driving timing of the direction shifting device.

The direction shifting device 13 includes a far-to-near shifting part 18 for changing the sensing ranges within long-distance, medium distance and short-distance ranges by shifting the sensing direction of the infrared ray sensing part 12 up and down, and a right-to-left driving part 19 for changing the sensing range by shifting the sensing direction of the infrared ray sensing part 12 right to left, and thus operates by scanning right to left for every scan line within long-distance, medium distance and short-distance ranges.

An operation of the thus-structured device for sensing the position of a human body using an infrared ray sensor of the present invention is as follows.

As illustrated in FIGS. 4 and 6, an infrared ray emitted from the human body is converged on the light focusing part 10 and focused at the infrared ray sensing part 12 having the infrared ray sensing sensor. As the cylindrical or rectangular type guide part 11 between the light focusing part 10 and the infrared ray sensing part 12 is installed in the same direction as the infrared ray sensing part 12, every infrared ray converged through the light focusing part 10 is not incident on the infrared ray sensing part 12, but only the infrared ray being incident in the direction where the guide part 11 and infrared ray sensing part 12 are placed on one line is incident on the infrared ray sensing part 12 though the guide part 11. At this time, because the infrared ray sensing part 12 having the guide part 11 and the infrared ray IR sensor is scanned up, down, right and left by the far-to-near shifting part 18 and right-to-left shifting part 19 of the direction shifting device 13, the position of the human body is determined by using the output of the infrared ray sensor of the infrared ray sensing part 12 which corresponds to the infrared ray emitted from the human body, and by using the scanning time corresponding to the right and left scanning rotation angle and the three-step-scanning operation within long-distance, medium-distance and short-distance ranges. Here, the short-distance range is from 1m to 3m, the medium-distance range is from 4m to 5m, and the long-distance range is above 6m.

As illustrated in FIG. 6, the determination of the presence of the human body is performed according to the below expression.

$$P = \theta \times \frac{t_1}{T_1}$$

In the above expression, $\theta$ is an angle for scanning by the guide part 11 and the infrared ray sensing part 12. $T_1$ is the time to scan the $\theta$. The output time of the infrared ray sensor of the infrared ray sensing part 12 by the infrared ray emitted from the human body is the point $t_1$ where the output signal turns from the high level of dc 5V to the low level of dc 0V. And the position of the human body is marked as P.

Accordingly, the driving timing of the right-to-left shifting part 19, which scans the output signal generated from the A/D converting part 16 of the circuit device 17, the guide part 11 and the infrared ray sensing part 12 at a predetermined angle, is treated at the determination part 20, so that the position of the human body, the shifting direction and the activity according to the position variation of the human body can be accurately sensed.

The guide part 11 and infrared ray sensing part 12, which scan from right to left, now line-scan in the three steps of long, middle, and short ranges by the far-to-near shifting part 18, and repeatedly perform that three-step-line scanning within long-distance, medium distance and short-distance ranges, and also within right, center and left ranges, even though the position of the human body has been already determined.

The above-mentioned infrared sensor of the present invention can sense not only the presence of the human body but also whether its position shifting direction and activity. Because it senses the position is of the human body by the guide part and infrared ray sensing part, the invention is so accurate, that it can be applicable to an air conditioning device to control and shift the direction or the strength of the wind of the air conditioner by using the information of the position and activity of the human body, thereby enabling the people inside to feel comfortable and reducing the power consumption.

Additionally, the invention can be used for sensing the position of a human body by using the light focusing part, the infrared ray sensing part, and the direction shifting device. And also the invention employs a unit sensor as the infrared ray sensing part and a light converging lens as the light focusing part, so that its structure is very simple, and thus can be manufactured at a low cost.

The invention is also applicable to a device relating to the human body's position such as an anti-crime device because the invention can detect the position and activity of the human body.

What is claimed is:

1. A device for sensing the position of a human body using an infrared ray sensor comprising:

a light focusing means for converging infrared rays emitted from the human body;

a guiding means for guiding only said infrared rays emitted from the human body at a predetermined direction;

an infrared ray sensing means for sensing the infrared rays guided by said guiding means;

a direction shifting means for shifting the guiding means and a sensing direction of said infrared ray sensing means up, down, right and left for every scan line within along distance, a medium distance and a short distance range;

a circuit for amplifying an output of said infrared ray sensing means, A/D converting said output, and driving said direction shifting means; and a determination means for determining the position, movement direction and amount of activity of a human body using a signal output from said circuit and a driving signal output from said direction shifting means.

2. The device as claimed in claim 1, wherein said guiding means and infrared ray sensing means are integrally formed in one direction.

3. The device as claimed in claim 1, wherein said guiding means guides through to said infrared ray sensing means only the infrared rays incident in a predetermined direction.

4. The device as claimed in claim 1, wherein said light focusing means comprises a fresnel lens and said infrared ray sensing means comprises a pyroelectric infrared ray sensor or a thermopile sensor.

5. The device as claimed in claim 1, wherein said direction shifting means comprises:

a far-to-near shifting part which shifts the directions of said guiding means and infrared ray sensing means up and down, and thus scans within a long-distance, a medium-distance, and a short-distance range; and a right-to-left shifting part which scans the directions of said guiding means and infrared ray sensing means from right to left.

6. The device as claimed in claim 1, wherein said circuit means comprises:

an amplifying part for amplifying the output of said infrared ray sensing means;

an A/D converting part for converting the output of said amplifying part into a digital signal; and a driving part for supplying power to said direction shifting means.

* * * * *